Figure 1:
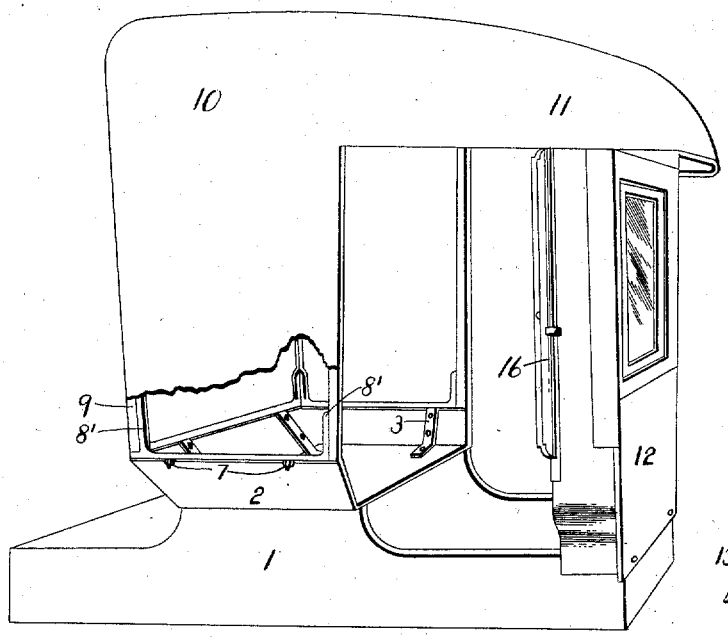

W. A. HUNTER.

STORM TOP FOR VEHICLES.

APPLICATION FILED JAN. 22, 1908.

Reissued May 9, 1911.

13,235.

3 SHEETS—SHEET 1.

ATTEST.

Bert M. Stahl.

Edward N. Sartori

INVENTOR.

William A. Hunter.

BY Shea Middleton Donaldson & Shea

ATTY'S.

THE NORRIS PETERS CO., WASHINGTON, D. C.

W. A. HUNTER.

STORM TOP FOR VEHICLES.

APPLICATION FILED JAN. 22, 1908.

Reissued May 9, 1911.

13,235.

3 SHEETS—SHEET 2.

ATTEST.

Bent McStahl.

Edward N. Sarton

INVENTOR.

William A. Hunter.

BY Spear Middleton Donaldson & Spear

ATTYS.

THE NORRIS PETERS CO., WASHINGTON, D. C.

W. A. HUNTER.

STORM TOP FOR VEHICLES.

APPLICATION FILED JAN. 22, 1908.

Reissued May 9, 1911.

13,235.

3 SHEETS—SHEET 3.

ATTEST.

Bert M. Stahl.

Edward W. Sarton

INVENTOR.

William A. Hunter.

BY Spear Middleton Donaldson & Spear

ATTY'S.

THE NORRIS PETERS CO., WASHINGTON, D. C.

UNITED STATES PATENT OFFICE.

WILLIAM A. HUNTER, OF TERRE HAUTE, INDIANA.

STORM-TOP FOR VEHICLES.

13,235. Specification of Reissued Letters Patent. Reissued May 9, 1911.

Original No. 830,664, dated September 11, 1906, Serial No. 288,985. Application for reissue filed January 22, 1908. Serial No. 412,080½.

*To all whom it may concern:*

Be it known that I, WILLIAM A. HUNTER, a citizen of the United States, residing at Terre Haute, Indiana, have invented certain new and useful Improvements in Storm-Tops for Vehicles, of which the following is a specification.

My invention hereinafter set forth relates to storm tops and fronts for vehicles.

Prior to my invention fronts have been provided applicable to and removable from the top, as occasion may require, and provided with curtains to inclose the side entrances. These involve difficulties in construction and application and defects in operation. In my said invention I have aimed to avoid these defects and simplify the construction, to make it strong and durable, to make the vehicle readily convertible into an open or closed carriage, to make it available for use as a covered carriage, both in storm or sunshine, and also to provide so that it may be readily made available as an open carriage. To secure these ends in the old way, usually the carriage top is made collapsible so that it may be thrown back, and the storm front is applied over the front of the ordinary top of the carriage, a matter mechanically difficult to accomplish and always defective at the line of junction of the front and top.

In the vehicle hereinafter described I have shown an entirely removable top, so constructed and combined with the body that it may be removed without removing the seat and so constructed and combined with the storm front that connections are simple and secure and so that the front may be removed with the side curtains and the top may remain as a shield against the heat of the sun, and thus by the simplest possible construction and the most durable all the necessary conditions are provided for.

My invention also includes some details of construction, all of which are hereinafter explained in connection with the accompanying drawings.

Figure 4:
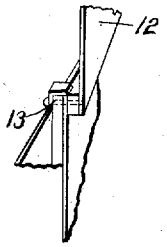
Figure 2:
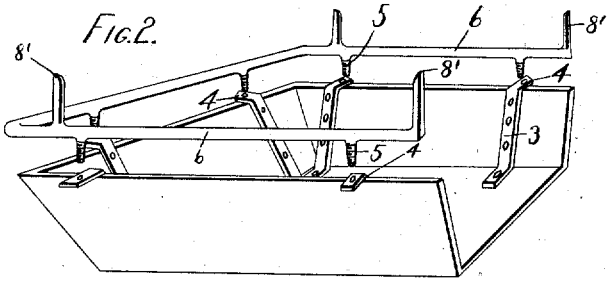
Figure 3:
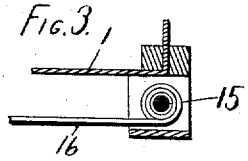
Figure 5:
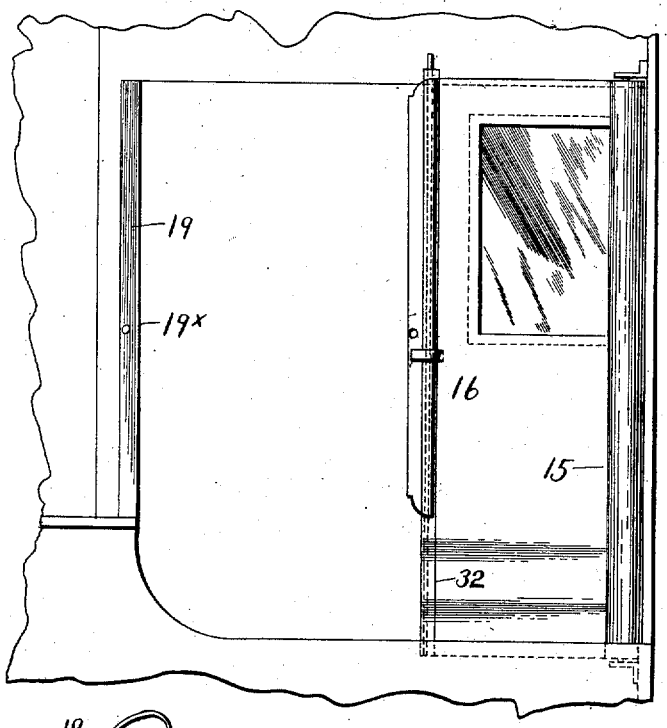
Figure 13:
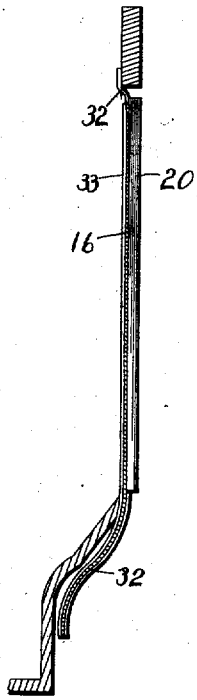
Figure 6:
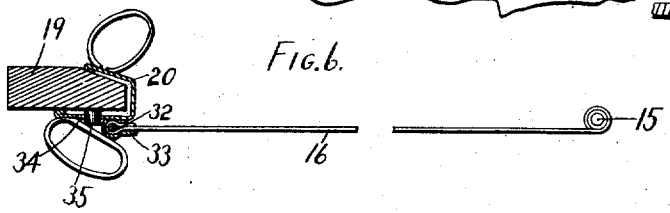
Figure 7:
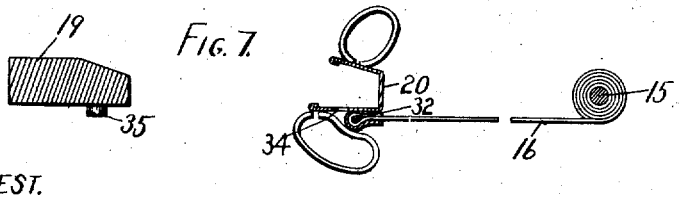
Figure 14:
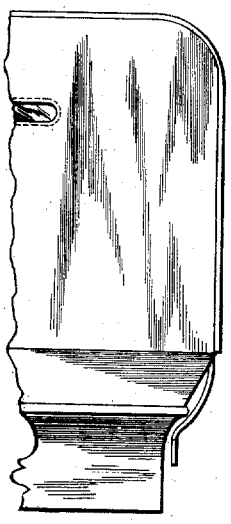
Figure 8:
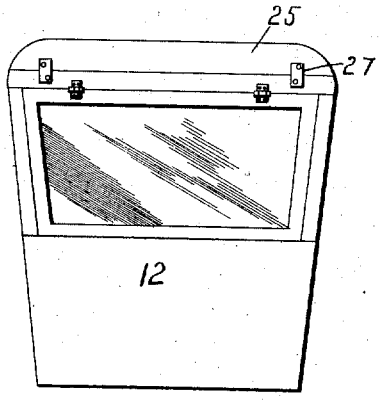
Figure 8:
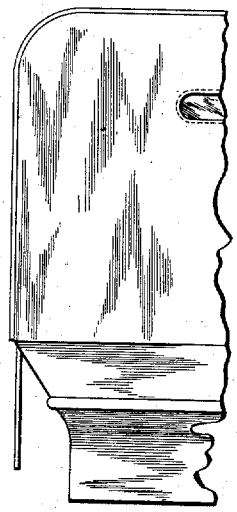
Figure 11:
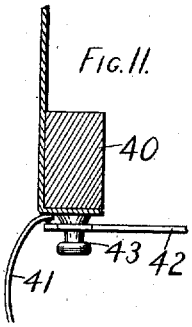
Figure 12:
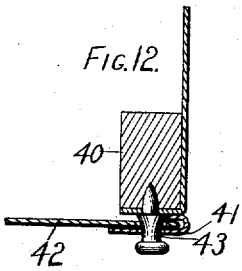
Figure 9:
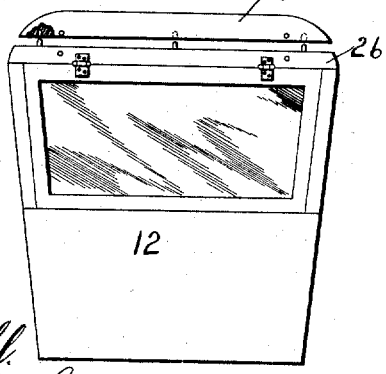
Figure 10:
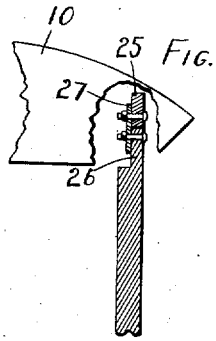

In the accompanying drawings, Figure 1 is a perspective view of a single seat buggy box with the invention applied thereto. Fig. 2 is a perspective view with the removable rail raised. Fig. 3 is a detail view of the curtain housing. Fig. 4 is a detail perspective view of the front fastening. Fig. 5 is a detail view, looking at the inside of the storm top with the side curtain partly rolled up. Fig. 6 is a detail sectional view in plan of the side curtain extended and joined to the post of the storm top, parts being in section. Fig. 7 is a detail sectional plan view similar to Fig. 6, with the side curtain partly rolled up. Figs. 8, 9 and 10 are detail front views relating to the storm front. Figs. 11 and 12 are detail views of the rear curtain and means for making the same secure. Fig. 13 is a detail view of the bent upper and lower ends of the wire of the side curtain. Fig. 14 is a rear view of the body with the storm top in place.

The body of the buggy (shown at 1 in Fig. 1) is representative of any vehicle of the class to which a storm top may be appropriately secured. The seat is shown at 2, and it may be permanently fixed to the body. In the form shown the top is attached directly to the seat, and there are iron standards 3 secured to the seat, flaring outwardly with horizontally turned ends forming lugs 4, which are provided with holes fitted to receive the downwardly projecting bolt extensions 5 of the rail 6. These extensions 5 correspond in number and location to the number of the lugs 4 and are threaded to receive the nuts 7, whereby the rail may be securely clamped to the lugs as so fixed upon the seat.

The top 10 and its forwardly extending portion 11, which projects over the front panel of the body, is formed with light but strong bent frames and is rigid throughout and is provided with any suitable covering. The rail 6, heretofore described and fixed to the seat, is shaped to conform to the lower edge of the main portion 10 of the top and approximately at least to the seat and is provided with extended projections 8′ to which are secured the vertical standards 9 of the frame of the part 10 of the top. The rail is permanently secured to these standards but may be removed with the top by releasing the nuts on the projections 5. The forward projection 11 which extends over the front portion of the body (and this is also a permanent rigid part of the top) is strong enough and rigid enough to sustain itself in use without any front support. In this forwardly extended end of the top at a point underneath the hooded end thereof is connected a storm front 12, which is also connected at its lower end to the front of the body and when in place forms a part of the general frame work of the top and covers the front of the vehicle.

In order to conform to the construction of my removable top and the general plan and scope of its use, I make this storm front detachable both from the body and from the top. With my invention however it is not necessary to have a part of the body removable and replaceable, and while in the present instance I describe the use of a removable dash I do not limit myself in this respect. The dash is made removable because it is of no use when my storm top is used, as said storm top has a portion 12 which performs all the functions of the dash. In the construction illustrated it is necessary only to remove the front fender or dasher of the body when the storm front is to be used, the lower end of the front 12 being removably bolted directly to the front of the body a very simple matter and easily done.

The construction is shown in Fig. 4 in which the cross bar of the front 12, fixed to its lower edge, is secured to the corner posts of the body by bolts, as indicated at 13.

In order to form a secure and light connection between the upper end of the front and the front end of the top, I fit the upper end of the front against the cross bar part of the frame of the top, as indicated at 25. The upper cross bar of the front is marked 26, and it is doweled upon the bar 25, abutting against it from underneath and is connected by metal straps 27 bolted to both bars. The dowels and the straps form a very light connection absolutely secure against rattling or looseness. It is better to fix the dowel pins in the upper edge of the front and to have the holes in the lower face of the bar 25. The upper joint is covered securely by the hood.

As hereinafter more particularly explained, the storm front carries the side curtains for closing the side openings in the top and these are consequently removed from the vehicle when the front is taken out. As a result of this construction if the carriage be used in pleasant weather when shelter is desired only from the rays of the sun, the front may be entirely removed both from the top and from the body carrying with it also the curtains which are not needed and which under such circumstances it is not desirable to carry on the top or upon the carriage. These side curtains are formed of flexible material suited to exclude the wind or rain and are carried upon rollers 15 mounted within the corner recess of the side posts of the frame of the storm front. The rollers are provided with the ordinary springs and without ratchets so that when the rear edge of the curtain 16 is released it is automatically drawn back and wound snugly upon the roller. The construction permits the curtains to extend upward above the lower edge of the top (Fig. 5), and downward below the upper edge of the body. At the upper edge it laps within and at the lower edge it laps outside thus providing a closure which will exclude the weather both at its upper and its lower edge.

The front edge 19× of the side wall of the top is substantially vertical and the rear edge of the curtain conforms thereto, so that the entrance to the carriage is substantially rectangular which is the most favorable for ingress or egress. The most difficult part of these carriage tops to make tight is this rear edge of the curtain and in order to effect this I have devised a special construction. (Shown in Figs. 5, 6 and 7 of the drawings). Several points require consideration in this connection. It is necessary that the curtain should be quickly and readily attached or detached, that the rear edge of the curtain should be rigid, and that it should be made to conform to the rear edge of the entrance, and further that it should inclose the rear edge from the outside at least in order to exclude wind or rain, and that it should be securely held in place. To accomplish these results effectually and economically I provide the rear edge with a channel shaped reinforcement 20, preferably formed of sheet metal, slightly flaring and adapted to fit snugly over the front standard 19 of the top frame. The front edge of this standard is shaped to correspond to the channel into which it fits tightly, as illustrated in Figs. 6 and 7. The channel piece 20 is straight and is in extent only equal to the length of the vertical post 19 exposed to the edge; but as the lower part of the curtain must conform to the tapered or contracted lower part of the body and as the upper part of the curtain extends underneath the top covering the channel part cannot support either the upper or lower edge of the door curtains. I therefore provide a supplementary reinforcement consisting of a piece of wire 32, preferably of material which may be bent to conform to any shape desirable for it to assume and to remain in the position into which it is bent. This wire is sewed into the rear edge of the curtain goods, and it is connected to the channel bar by means of a metal flange thereon (marked 33). The ends of the wire may be bent as shown in Fig. 13 to deflect it at the top or at the bottom to conform to the shape of the body which as shown in Fig. 14 is tapered downwardly.

The channel piece 20 is provided with an opening 34 adapted to engage a stud 35 on the standard 19.

It will be observed that the wire may be stitched into the edge of the cloth and afterward inserted under the flange 33 of the channel piece and this flange may then be rolled down and thus hold the wire and with it the edge of the cloth or leather of the curtain, securely in place. The channel piece is stiff and strong and forms a secure joint, and the short projecting ends of the wire from their position suffering less strain are sufficient to hold the upper and lower extremities of the curtain in proper position even against a strong blast of wind. As the curtain goes with the removable front and stands in a vertical position it is out of the way when the front is used, and the carriage is free from the front curtain and its attachments when the front is removed.

The construction and arrangement above described, whereby the side curtains are lapped within the cover of the top at their upper edge, makes them secure against the entrance of rain. In order to give like security to the rear curtain which is drawn down I have provided by another device a flap and like security. This I have shown in separate views Figs. 11 and 12. In these figures which illustrate the device applied to the rear curtain 40 indicates a rear corner post or back bow. I have formed a flap in combination with this post. A strip of the material which composes the cover of the top (marked 41) has one edge fixed to the post, so that it forms a narrow flap extending the entire vertical length of the curtain edge. The curtain is shown at 42 (or a sufficient part of it for illustration) and it is secured to the post in the ordinary way, as by means of buttons 43, fixed in the post. Supposing the curtain be drawn down and secured by engagement with the buttons, the flap 41 is folded over the edge of it and secured by engagement with the same buttons which pass through the edge of the curtain. In this way the edge is covered and made secure against wind or rain. This construction may be applied wherever there is a post or the equivalent of a post or equivalent firm support and by post I means any such firm support.

Having thus described my invention what I claim is:

1. In combination with a vehicle top, a depending front and vertically arranged rollers carried by the front and having curtains thereon, said curtains having each an elongated strip at its free edge interlocking by a tongue and channel joint with the vertical post of the top to make a storm tight joint, each of said curtains having an extension beyond the strip, said extensions being integral and flexible throughout their extent, substantially as described.

2. The combination with a vehicle body having a seat portion permanently carried thereby, a top having means for detachably connecting the same with the permanent seat portion, said top carrying as one body therewith a depending front member, means for detachably connecting the top to the permanent seat portion, and means for detachably connecting the depending front to the body and also for detachably connecting the said front at its upper end to the top, and vertical roller curtains carried by the depending front and movable horizontally to close the side openings, said top, together with the curtains and depending front, being removable as one body or the said depending front being removable independently of the rest of the top, substantially as described.

3. A storm top having a curtain arranged on an upright roller the free edge of which is provided with a rigid piece and an extension above and below the same, the lower extension being shaped to conform to the side of the body and the upper portion being bent laterally, substantially as described.

4. In combination with a vehicle body, a top, curtains carried by vertical rollers on said top, said curtains having a rigid piece at the central portion of its free vertical edge to interlock with part of the top by a tongue and channel joint and having extensions conforming to the tapered form of the body, substantially as described.

5. In combination with a vehicle top having a post, a curtain to close the side opening, a vertically disposed roller for the said curtain, a channel member at the free edge of the curtain interlocking with the post on the top, said interlocking member having its channel facing rearwardly to make a storm tight joint with the post along the vertical edge of the curtain, and a flexible extension beyond the channel piece to hold the curtain close to the side of the body, substantially as described.

6. In combination with a vehicle top, a depending front, vertically arranged rollers carried by the front and having curtains thereon, said curtains having an elongated channel strip at their free edges interlocking with the vertical post of the top to make a storm tight joint, and an extension beyond the channel strip to which the curtain is attached, substantially as described.

In testimony whereof I affix my signature in presence of two witnesses.

WILLIAM A. HUNTER.

Witnesses:
V. H. Lockwood,
N. Allemong.

Copies of this patent may be obtained for five cents each, by addressing the "Commissioner of Patents, Washington, D. C."